US006313053B1

(12) United States Patent
Shelestak

(10) Patent No.: US 6,313,053 B1
(45) Date of Patent: *Nov. 6, 2001

(54) INFRARED AND ULTRAVIOLET RADIATION ABSORBING BLUE GLASS COMPOSITION

(75) Inventor: Larry J. Shelestak, Bairdford, PA (US)

(73) Assignee: PPG Industries Ohio, Inc., Cleveland, OH (US)

(*) Notice: Subject to any disclaimer, the term of this patent is extended or adjusted under 35 U.S.C. 154(b) by 0 days.

This patent is subject to a terminal disclaimer.

(21) Appl. No.: 09/058,381

(22) Filed: Apr. 9, 1998

Related U.S. Application Data

(63) Continuation-in-part of application No. 08/954,722, filed on Oct. 20, 1997, now abandoned.

(51) Int. Cl.$^7$ .............................. C03C 3/087; C03C 4/02; C03C 4/10; C03C 4/08
(52) U.S. Cl. .............................. 501/71; 501/904; 501/905
(58) Field of Search ............................... 501/71, 904, 905

(56) References Cited

U.S. PATENT DOCUMENTS

| Re. 25,312 | 1/1963 | Duncan et al. ................. 501/71 |
|---|---|---|
| Re. 34,639 | 6/1994 | Boulos et al. .................. 501/71 |
| Re. 34,760 | 10/1994 | Boulos et al. .................. 501/71 |
| 1,737,685 | 12/1929 | Rising ........................... 501/65 |
| 1,737,686 | 12/1929 | Rising ........................... 501/69 |
| 1,924,752 | 8/1933 | Rising ........................... 501/65 |
| 2,144,943 | 1/1939 | Sharp et al. .................... 501/70 |
| 2,397,195 | 3/1946 | Mook et al. .................... 501/58 |
| 2,755,212 | 7/1956 | Brown .......................... 501/17 |
| 3,024,120 | 3/1962 | Babcock ....................... 501/17 |
| 3,024,121 | 3/1962 | Hagedorn ..................... 501/71 |
| 3,206,659 | 9/1965 | Goodman et al. ............ 391/280 |
| 3,330,638 | 7/1967 | Brown ........................ 65/134.3 |
| 3,498,806 | 3/1970 | Hammer et al. ............... 501/71 |
| 3,523,779 | 8/1970 | Keshari et al. ............... 65/134.3 |
| 3,652,303 | 3/1972 | Janakirama Rao ............. 106/52 |
| 3,672,919 | 6/1972 | Sack ............................. 501/59 |
| 3,779,733 | 12/1973 | Janakirama Rao ............ 65/32.5 |
| 4,104,076 | 8/1978 | Pons ............................. 501/66 |
| 4,381,934 | 5/1983 | Kunkle et al. ................ 65/135.4 |
| 4,713,359 | 12/1987 | Lubelski et al. .............. 501/63 |
| 4,792,536 | 12/1988 | Pecoraro et al. .............. 501/70 |
| 4,866,010 | 9/1989 | Boulos et al. ................. 501/71 |
| 4,886,539 | 12/1989 | Cerutti et al. ............... 65/134.2 |
| 5,013,487 | 5/1991 | Cheng ......................... 252/587 |
| 5,023,210 | 6/1991 | Krumwiede et al. .......... 501/71 |
| 5,069,826 | 12/1991 | Cheng ......................... 252/587 |
| 5,070,048 | 12/1991 | Boulos et al. ................. 501/71 |
| 5,264,400 | 11/1993 | Nakaguchi et al. ........... 501/71 |
| 5,278,108 | 1/1994 | Cheng et al. ................. 501/71 |
| 5,308,805 | 5/1994 | Baker et al. .................. 501/71 |
| 5,344,798 | 9/1994 | Morimoto et al. ............ 501/70 |
| 5,346,867 | 9/1994 | Jones et al. .................. 501/71 |
| 5,364,820 | 11/1994 | Morimoto et al. ............ 501/71 |
| 5,380,685 | 1/1995 | Morimoto et al. ............ 501/71 |
| 5,393,593 | 2/1995 | Gulotta et al. ............... 428/220 |
| 5,411,922 | 5/1995 | Jones .......................... 501/71 |
| 5,478,783 | 12/1995 | Higby et al. .................. 501/27 |
| 5,545,596 | 8/1996 | Alvarez-Casariego et al. ... 501/71 |
| 5,582,455 | 12/1996 | Casariego et al. .......... 296/146.2 |
| 5,688,727 | 11/1997 | Shelestak et al. ............. 501/71 |
| 5,780,372 | * 7/1998 | Higby ......................... 501/71 |
| 5,994,249 | * 11/1999 | Graber et al. ................. 501/71 |

FOREIGN PATENT DOCUMENTS

| 19636303 | 3/1997 | (DE) . |
|---|---|---|
| 0527487 | 2/1993 | (EP) . |
| 0644164 | 3/1995 | (EP) . |
| 0677492 | 10/1995 | (EP) . |
| 2672587 | 8/1992 | (FR) . |

* cited by examiner

*Primary Examiner*—Michael Marcheschi
(74) *Attorney, Agent, or Firm*—Andrew C. Siminerio; Kenneth J. Stachel

(57) ABSTRACT

The present invention provides a blue colored glass using a standard soda-lime-silica glass base composition and additionally iron and cobalt, and optionally chromium, as solar radiation absorbing materials and colorants. In particular, the blue colored glass includes about 0.40 to 1.0 wt. % total iron, preferably about 0.50 to 0.75 wt. %, about 4 to 40 PPM CoO, preferably about 4 to 20 PPM, and 0 to 100 PPM $Cr_2O_3$. The redox ratio for the glass of the present invention is greater than 0.35 up to about 0.60, and preferably between about 0.36 to 0.50. In one particular embodiment of the invention, the glass has a luminous transmittance of at least 55% and a color characterized by a dominant wavelength of 485 to 489 nanometers and an excitation purity of about 3 to 18 percent. In another embodiment of the invention, the glass has a luminous transmittance of at least 65% at a thickness of about 0.154 inches (3.9 mm) and a color characterized by a dominant wavelength of 485 to 492 nanometers and an excitation purity of about 3 to 18 percent.

29 Claims, No Drawings

INFRARED AND ULTRAVIOLET RADIATION ABSORBING BLUE GLASS COMPOSITION

CROSS REFERENCE TO RELATED APPLICATION

This application is a continuation-in-part of U.S. application Ser. No. 08/954,722 filed Oct. 20, 1997 Abandoned.

BACKGROUND OF THE INVENTION

1. Field of the Invention

This invention relates to an infrared and ultraviolet radiation absorbing blue colored soda-lime-silica glass composition suitable for architectural and automotive glazing applications. The glass should have a dominant wavelength of about 485 to 492 nanometers (nm) and an excitation purity of about 3 to 18 percent. The glass is also compatible with flat glass manufacturing methods.

2A. Technical Considerations

Infrared and ultraviolet radiation absorbing colored glass substrates have a variety of different applications. In particular, such glasses may be used by architects to glaze buildings and by vehicle designers as automotive windows. Besides providing an aesthetically pleasing color, these glasses may also provide enhanced solar performance as compared to conventional clear glass.

Different materials may be added to the glass in order to provide the desired color and spectral performance. For example, iron, cobalt, nickel, selenium and titanium, to name a few, are typically added to provide the desired color composition. As materials are added to change color and enhance solar performance, care must be taken to maintain the visible light transmittance and color required for that particular application. It should also be remembered that changing the thickness of the glass will affect these spectral properties so that a particular composition which has acceptable color and performance at a particular thickness may not be acceptable at a different thickness.

One particular blue composition that provides superior spectral performance is disclosed in U.S. Pat. No. 4,792,536 to Pecoraro, et al. Commercial products which incorporate this patent are sold by PPG Industries, Inc. under the trademarks SOLEXTRA® and AZURLITE®. This glass incorporates a moderate amount of iron in the composition and has a relatively large portion of the glass in the ferrous state, expressed as FeO. In particular, the glass composition includes a basic soda-lime-silica composition and further includes 0.45 to 1 weight percent total iron (expressed as $Fe_2O_3$). At least 35 percent of the total iron is in the ferrous state. The dominant wavelength of these glasses range from about 486 to 489 nm and excitation purity ranges from about 8 to 14 percent. From a processing standpoint, producing the glass disclosed in the patent with a high ratio of ferrous iron to total iron may require additional processing considerations not typically associated with conventional glass melting operations, as are well known in the art. However, due to the favorable acceptance of this product, it would be advantageous to be able to produce a glass having a similar color and enhanced spectral performance using conventional glass melting processing techniques.

2B. Patents of Interest

U.S. Pat. No. 3,652,303 to Janakirama Rao discloses a blue, heat absorbing glass which incorporates low amounts of iron and uses tin to convert and retain a significant portion of the iron in the ferrous state, and in particular more than 80% of the iron is retained in the ferrous state.

U.S. Pat. Nos. 4,866,010 and 5,070,048 to Boulos, et al. disclose blue glass compositions with a colorant portion consisting essentially of iron and cobalt and further including nickel and/or selenium. The glasses have a dominant wavelength of 482 nanometers (nm) ±1 nm and a color purity of 13% ±1%.

U.S. Pat. Nos. 5,013,487 and 5,069,826 to Cheng disclose blue colored glass compositions which include iron, titanium, tin and zinc as colorants. The glasses have a dominant wavelength ranging from 485 to 494 nm and a color purity of 5 to 9%.

U.S. Pat. No. 5,344,798 to Morimoto, et al. discloses a blue glass composition which includes iron, cerium, titanium, zinc, cobalt and manganese. These glasses have a dominant wavelength of 495 to 505 nm and a color purity of 5 to 9%.

SUMMARY OF THE INVENTION

The present invention provides a blue colored glass using a standard soda-lime-silica glass base composition and additionally iron and cobalt, and optionally chromium, as solar radiation absorbing materials and colorants. In particular, the blue colored glass includes about 0.40 to 1.0 wt. % total iron, preferably about 0.50 to 0.75 wt. %, about 4 to 40 PPM CoO, preferably about 4 to 20 PPM, and 0 to 100 PPM $Cr_2O_3$. The redox ratio for the glass of the present invention is greater than 0.35 up to about 0.60, and preferably between about 0.36 to 0.50. In one particular embodiment of the invention, the glass has a luminous transmittance of at least 55 percent and a color characterized by a dominant wavelength of 485 to 489 nanometers and an excitation purity of about 3 to 18 percent. In another embodiment of the invention, the glass has a luminous transmittance of at least 65 percent at a thickness of about 0.154 inches (3.9 mm) and a color characterized by a dominant wavelength of 485 to 492 nanometers and an excitation purity of about 3 to 18 percent.

DETAILED DESCRIPTION OF THE INVENTION

The base glass composition of the present invention is commercial soda-lime-silica glass characterized as follows:

|  | Weight Percent |
| --- | --- |
| $SiO_2$ | 66 to 75 |
| $Na_2O$ | 10 to 20 |
| CaO | 5 to 15 |
| MgO | 0 to 5 |
| $Al_2O_3$ | 0 to 5 |
| $K_2O$ | 0 to 5 |

As used herein, all "weight percent (wt. %)" values are based on the total weight of the final glass composition.

To this base glass, the present invention adds infrared and ultraviolet radiation absorbing materials and colorants in the form of iron and cobalt, and, optionally, chromium. As disclosed herein, iron is expressed in terms of $Fe_2O_3$ and FeO, cobalt is expressed in terms of CoO, and chromium is expressed in terms of $Cr_2O_3$. It should be appreciated that the glass compositions disclosed herein may include small amounts of other materials, for example meting and refining aids, tramp materials or impurities. It should be further appreciated that in one embodiment of the invention, small amounts of additional materials may be included to color the glass and/or improve its solar performance, as will be discussed later in more detail.

The iron oxides in a glass composition perform several functions. Ferric oxide, $Fe_2O_3$, is a good ultraviolet radiation absorber and operates as a yellow colorant in the glass. Ferrous oxide, FeO, is a good infrared radiation absorber and operates as a blue colorant. The total amount of iron present in the glasses disclosed herein is expressed in terms of $Fe_2O_3$ in accordance with standard analytical practice, but that does not imply that all of the iron is actually in the form of $Fe_2O_3$. Likewise, the amount of iron in the ferrous state is reported as FeO, even though it may not actually be present in the glass as FeO. In order to reflect the relative amounts of ferrous and ferric iron in the glass compositions disclosed herein, the term "redox" shall mean the amount of iron in the ferrous state (expressed as FeO) divided by the amount of total iron (expressed as $Fe_2O_3$). Furthermore, unless stated otherwise, the term "total iron" in this specification shall mean total iron expressed in terms of $Fe_2O_3$, the term "$Fe_2O_3$" shall mean iron in the ferric state expressed in terms of $Fe_2O_3$ and the term "FeO" shall mean iron in the ferrous state expressed in terms of FeO.

CoO operates as a blue colorant and a weak infrared radiation absorber in the glass. $Cr_2O_3$ may be added to impart a green color component to the glass composition. In addition, it is believed that the chromium may also provide some ultraviolet radiation absorption. A proper balance between the iron, i.e. ferric and ferrous oxides, and cobalt, and optionally chromium, content is required to obtain a glass with the desired blue color and spectral properties.

The glass of the present invention may be melted and refined in a continuous, large-scale, commercial glass melting operation and formed into flat glass sheets of varying thickness by the float method in which the molten glass is supported on a pool of molten metal, usually tin, as it assumes a ribbon shape and is cooled in a manner well known in the art.

Although it is preferred that the glass disclosed herein be made using a conventional, overhead fired continuous melting operation, as is well known in the art, the glass may also be produced using a multi-stage melting operation, as disclosed in U.S. Pat. Nos. 4,381,934 to Kunkle, et al.; 4,792,536 to Pecoraro, et al. and 4,886,539 to Cerutti, et al. If required, a stirring arrangement may be employed within the melting and/or forming stages of the glass production operation to homogenize the glass in order to produce glass of the highest optical quality.

Depending on the type of melting operation, sulfur may be added to the batch materials of a soda-lime-silica glass as a melting and refining aid. Commercially produced float glass may include up to about 0.3 wt. % $SO_3$. In a glass composition that includes iron and sulfur, providing reducing conditions may create amber coloration which lowers luminous transmittance as discussed in U.S. Pat. No. 4,792,536 to Pecoraro, et al. However, it is believed that the reducing conditions required to produce this coloration in float glass compositions of the type disclosed herein are limited to approximately the first 20 microns of the lower glass surface contacting the molten tin during the float forming operation, and to a lesser extent, to the exposed upper glass surface. Because of the low sulfur content and the limited region of the glass in which any coloration could occur, depending on the particular soda-lime-silica-glass composition, sulfur in these surfaces has no material effect on the glass color or spectral properties.

It should be appreciated that as a result of forming the glass on molten tin as discussed above, measurable amounts of tin oxide may migrate into surface portions of the glass on the side contacting the molten tin. Typically, a piece of float glass has an $SnO_2$ concentration of at least 0.05 to 2 wt. % in the first 25 microns below the surface of the glass that was in contact with the tin. Typical background levels of $SnO_2$ may be as high as 30 parts per million (PPM). It is believed that high tin concentrations in about the first 10 angstroms of the glass surface supported by the molten tin may slightly increase the reflectivity of that glass surface; however, the overall impact on the glass properties is minimal.

Table 1 illustrates experimental glass melts which embody the principles of the present invention. Similarly, Table 2 illustrates a series of computer modeled glass compositions embodying the principles of the present invention. The modeled compositions were generated by a glass color and spectral performance computer model developed by PPG Industries, Inc. Table 3 illustrates the composition of several glass samples incorporating the principles of the present invention, which were fabricated on a commercial, conventional, overhead fired continuous glass melter of the type disclosed earlier. Only the iron and cobalt portions of the compositions are listed in Tables 1 and 3 while Table 2 includes the iron, cobalt and chromium portions of the compositions. Tables 4–6 list the spectral properties of the compositions shown in Tables 1, 2 and 3 at reference thicknesses of 0.084 inches (2.13 mm), 0.154 inches (3.9 mm) and 0.223 inches (5.66 mm), respectively.

With respect to the data provided in Tables 4–6 for Examples 1–16 of Table 1 and Examples 30–34 of Table 3, the luminous transmittance (LTA) is measured using C.I.E. standard illuminant "A" with a C.I.E. 2° observer over the wavelength range of 380 to 770 nanometers. The solar transmittance (LTS) is measured over the wavelength range of 380 to 770 nm using the C.I.E. 2° observer and the weighting factors specified in ASTM 891-87. Glass color, in terms of dominant wavelength (DW) and excitation purity (Pe), is measured using C.I.E. standard illuminant "C" with a 2° observer, following the procedures established in ASTM E 308-90. The total solar ultraviolet transmittance (TSUV) is measured over the wavelength range of 300 to 400 nanometers, total solar infrared transmittance (TSIR) is measured over the wavelength range of 720 to 2000 nanometers, and total solar energy transmittance (TSET) is measured over the wavelength range of 300 to 2000 nanometers. The TSUV, TSIR and TSET transmittance data is calculated using Parry Moon air mass 2.0 direct solar irradiance data and integrated using the Trapezoidal Rule, as is known in the art. The shading coefficient (SC), which is the ratio of the total solar heat gain for a sample to the total solar heat gain of a nominal 3 mm thick (⅛ inch) clear glass reference, is calculated using the Window 4.1 computer program available from Lawrence Berkeley Laboratory. The spectral properties presented in Tables 4–6 for Examples 17–29 of Table 2 are based on the same wavelength ranges and calculation procedures.

Sample Preparation

The information provided in Table 1 is based on experimental laboratory melts having approximately the following basic batch components:

| | |
|---|---|
| sand | 500 gm |
| soda ash | 162.8 gm |
| limestone | 42 gm |
| dolomite | 121 gm |
| salt cake | 2.5 gm |

-continued

| | |
|---|---|
| rouge | as required |
| $Co_3O_4$ | as required |

Coal was added to each melt to control redox. In preparing the melts, the ingredients were weighed out and blended in a mixer. Half of the material was then placed in a refractory silica crucible and heated to 2650° F. (1454° C.) for 30 minutes. The remaining material was then added to the crucible and heated to 2650° F. (1454° C.) for 1.5 hours. Next, the molten glass was fritted in water, dried and reheated at 2650° F. (1454° C.) for one hour. The molten glass was then fritted a second time in water, dried and reheated to 2650° F. (1454° C.) for two hours. The molten glass was then poured out of the crucible and annealed. Samples were cut from the slab and ground and polished for analysis.

The chemical analysis of the glass compositions was determined using a RIGAKU 3370 X-ray fluorescence spectrophotometer. The FeO content for Examples 1–16 was determined using wet chemistry techniques, as are well known in the art. The FeO content for Examples 30–34 was calculated using the glass color and spectral performance computer model discussed earlier. The spectral characteristics of the glass were determined on annealed samples using a Perkin-Elmer Lambda 9 UV/VIS/NIR spectrophotometer prior to tempering the glass or prolonged exposure to ultraviolet radiation, which will affect the spectral properties as will be discussed later.

The following is representative of the basic oxides of the glasses disclosed in Tables 1 and 3:

| | Ex. 1–16 of Table 1 | Ex. 30–34 of Table 3 |
|---|---|---|
| $SiO_2$ | 73.3 to 73.9 wt. % | ~72.5 wt. % |
| $Na_2O$ | 13.2 to 13.6 wt. % | ~13.8 wt. % |
| $K_2O$ | 0.031 to 0.034 wt. % | ~0.046 wt. % |
| CaO | 8.5 to 8.8 wt. % | ~9 wt .% |
| MgO | 3.6 to 3.8 wt. % | ~3.2 wt. % |
| $Al_2O_3$ | 0.12 to 0.16 wt. % | ~0.24 wt. % |

It is expected that the basic oxide constituents of commercial soda-lime-silica glass compositions based on the experimental melts disclosed in Table 1 and the modeled compositions disclosed in Table 2 would be similar to those discussed earlier.

Although not included in Table 1, analysis of Examples 1–16 indicated up to about 6 PPM $Cr_2O_3$, up to about 30 PPM $MnO_2$ and up to about 0.013 weight percent $TiO_2$. These materials were most likely introduced into the glass composition from the batch raw materials or glass processing equipment. Similarly, although not included in Table 3, analysis of Examples 30–34 indicated up to about 9 PPM $Cr_2O_3$, up to about 26 PPM $MnO_2$ and up to about 0.021 weight percent $TiO_2$. These materials were also most likely introduced into the glass composition from the batch raw materials or glass processing equipment as well as from residual materials in the glass melter. All of the computer modeled compositions in Table 2 were modeled to include 38 PPM $MnO_2$ (not shown in Table 2) and Examples 17–23 were modeled to include 7 PPM $Cr_2O_3$, which are typical detectable levels of chromium and manganese. The chromium and manganese at these levels were included in the modeled compositions to provide a more accurate representation of the glass using the model. It is believed that these amounts of chromium, manganese and titanium in Examples 1–29 of Tables 1 and 2 and the chromium and manganese in Examples 30–34 of Table 3 are tramp and/or residual levels which will not materially affect the color and spectral properties of the glass. The $TiO_2$ level in Examples 30–34, which is believed to be due to residual titanium still in the glass melter, should have only a minimal, if any, affect on the glass color and spectral properties of the glass compositions of the instant invention. Furthermore, it is believed that glass compositions embodying the features of the instant invention may be produced with no or trace levels of $TiO_2$.

TABLE 1

Experimental Glass Melt Compositions

| | Ex. 1 | Ex. 2 | Ex. 3 | Ex. 4 | Ex. 5 | Ex. 6 | Ex. 7 | Ex. 8 | Ex. 9 | Ex. 10 | Ex. 11 | Ex. 12 | Ex. 13 | Ex. 14 | Ex. 15 | Ex. 16 |
|---|---|---|---|---|---|---|---|---|---|---|---|---|---|---|---|---|
| Total Iron (wt. %) | 0.591 | 0.607 | 0.613 | 0.616 | 0.629 | 0.632 | 0.637 | 0.641 | 0.659 | 0.661 | 0.664 | 0.671 | 0.679 | 0.699 | 0.717 | 0.720 |
| $Fe_2O_3$ (wt. %) | 0.271 | 0.311 | 0.306 | 0.360 | 0.371 | 0.279 | 0.368 | 0.337 | 0.310 | 0.334 | 0.333 | 0.286 | 0.350 | 0.399 | 0.410 | 0.340 |
| FeO (wt. %) | 0.288 | 0.266 | 0.276 | 0.230 | 0.232 | 0.318 | 0.242 | 0.274 | 0.314 | 0.294 | 0.298 | 0.258 | 0.296 | 0.270 | 0.276 | 0.342 |
| Redox | 0.487 | 0.438 | 0.450 | 0.373 | 0.369 | 0.503 | 0.380 | 0.427 | 0.476 | 0.445 | 0.449 | 0.385 | 0.436 | 0.386 | 0.385 | 0.475 |
| CoO(PPM) | 13 | 13 | 7 | 12 | 6 | 14 | 6 | 12 | 7 | 6 | 14 | 12 | 6 | 6 | 6 | 6 |

TABLE 2

Computer Modeled Glass Compositions

| | Ex. 17 | Ex. 18 | Ex. 19 | Ex. 20 | Ex. 21 | Ex. 22 | Ex. 23 | Ex. 24 | Ex. 25 | Ex. 26 | Ex. 27 | Ex. 28 | Ex. 29 |
|---|---|---|---|---|---|---|---|---|---|---|---|---|---|
| Total Iron (wt. %) | 0.45 | 0.50 | 0.55 | 0.75 | 0.80 | 0.90 | 1.0 | 0.50 | 0.50 | 0.50 | 0.55 | 0.55 | 0.55 |
| $Fe_2O_3$ (wt. %) | 0.141 | 0.211 | 0.269 | 0.450 | 0.480 | 0.540 | 0.600 | 0.211 | 0.211 | 0.211 | 0.269 | 0.269 | 0.269 |
| FeO (wt. %) | 0.278 | 0.260 | 0.253 | 0.270 | 0.288 | 0.324 | 0.360 | 0.260 | 0.260 | 0.260 | 0.253 | 0.253 | 0.253 |
| Redox | 0.58 | 0.52 | 0.46 | 0.36 | 0.36 | 0.36 | 0.36 | 0.52 | 0.52 | 0.52 | 0.46 | 0.46 | 0.46 |

TABLE 2-continued

Computer Modeled Glass Compositions

| | Ex. 17 | Ex. 18 | Ex. 19 | Ex. 20 | Ex. 21 | Ex. 22 | Ex. 23 | Ex. 24 | Ex. 25 | Ex. 26 | Ex. 27 | Ex. 28 | Ex. 29 |
|---|---|---|---|---|---|---|---|---|---|---|---|---|---|
| CoO(PPM) | 5 | 5 | 5 | 5 | 3 | 3 | 3 | 5 | 5 | 5 | 5 | 5 | 5 |
| $Cr_2O_3$ (PPM) | 7 | 7 | 7 | 7 | 7 | 7 | 7 | 25 | 50 | 75 | 25 | 50 | 75 |

TABLE 3

Production Glass Compositions

| | Ex. 30 | Ex. 31 | Ex. 32 | Ex. 33 | Ex. 34 |
|---|---|---|---|---|---|
| Total Iron (wt. %) | 0.55 | 0.554 | 0.552 | 0.553 | 0.548 |
| $Fe_2O_3$ (wt. %) | 0.263 | 0.258 | 0.254 | 0.256 | 0.252 |
| FeO (wt. %) | 0.258 | 0.266 | 0.268 | 0.267 | 0.266 |
| Redox | 0.469 | 0.480 | 0.485 | 0.482 | 0.486 |
| CoO (PPM) | 11 | 9 | 9 | 9 | 10 |

TABLE 4

Spectral Properties at 0.084 inches (2.13 mm)

| | Ex. 1 | Ex. 2 | Ex. 3 | Ex. 4 | Ex. 5 | Ex. 6 | Ex. 7 | Ex. 8 | Ex. 9 | Ex. 10 | Ex. 11 | Ex. 12 | Ex. 13 | Ex. 14 | Ex. 15 | Ex. 16 | Ex. 17 |
|---|---|---|---|---|---|---|---|---|---|---|---|---|---|---|---|---|---|
| LTA (%) | 77.8 | 78.3 | 78.7 | 79.4 | 80.4 | 76.5 | 79.7 | 78.3 | 77.8 | 77.5 | 76.9 | 78.4 | 78.0 | 78.7 | 78.4 | 76.0 | 80.4 |
| LTS (%) | 79.3 | 79.7 | 80.2 | 80.6 | 81.6 | 78.1 | 81.0 | 79.7 | 79.3 | 79.12 | 78.4 | 79.7 | 79.5 | 80.1 | 79.8 | 77.7 | 81.7 |
| TSUV (%) | 69.0 | 68.3 | 68.2 | 66.4 | 65.3 | 68.2 | 65.8 | 66.5 | 67.2 | 67.0 | 66.9 | 65.0 | 65.9 | 64.2 | 63.4 | 65.2 | 75.1 |
| TSIR (%) | 32.9 | 34.5 | 33.2 | 39.4 | 41.1 | 29.0 | 38.0 | 35.5 | 30.4 | 29.8 | 29.7 | 35.8 | 31.8 | 35.1 | 34.4 | 27.0 | 39.4 |
| TSET (%) | 54.0 | 55.0 | 54.4 | 58.1 | 59.2 | 51.3 | 57.3 | 55.6 | 52.5 | 52.0 | 51.9 | 55.7 | 53.3 | 55.3 | 54.7 | 49.8 | 58.8 |
| DW (nm) | 487.1 | 487.2 | 487.7 | 487.7 | 488.8 | 487.3 | 488.4 | 487.5 | 487.8 | 487.8 | 487.2 | 487.9 | 488.0 | 488.6 | 488.7 | 487.9 | 486.4 |
| Pe (%) | 6.30 | 5.98 | 5.86 | 4.99 | 4.33 | 6.78 | 4.85 | 5.64 | 6.18 | 6.31 | 6.51 | 5.30 | 5.85 | 5.15 | 5.13 | 6.67 | 5.28 |
| SC | 0.74 | 0.75 | 0.75 | 0.78 | 0.79 | 0.72 | 0.77 | 0.76 | 0.73 | 0.72 | 0.72 | 0.76 | 0.74 | 0.75 | 0.75 | 0.71 | 0.78 |

| | Ex. 18 | Ex. 19 | Ex. 20 | Ex. 21 | Ex. 22 | Ex. 23 | Ex. 24 | Ex. 25 | Ex. 26 | Ex. 27 | Ex. 28 | Ex. 29 | Ex. 30 | Ex. 31 | Ex. 32 | Ex. 33 | Ex. 34 |
|---|---|---|---|---|---|---|---|---|---|---|---|---|---|---|---|---|---|
| LTA (%) | 80.3 | 80.4 | 79.3 | 78.9 | 77.6 | 76.3 | 80.1 | 79.9 | 79.6 | 80.2 | 79.9 | 79.7 | 79.8 | 79.7 | 79.7 | 79.8 | 79.9 |
| LTS (%) | 81.6 | 81.6 | 80.5 | 80.2 | 78.9 | 77.7 | 81.4 | 81.1 | 80.9 | 81.4 | 81.1 | 80.9 | 81.0 | 81.2 | 81.0 | 81.0 | 81.1 |
| TSUV (%) | 72.2 | 69.3 | 61.8 | 60.8 | 58.7 | 56.8 | 72.2 | 72.2 | 72.1 | 69.3 | 69.3 | 69.2 | 66.0 | 66.0 | 66.3 | 66.4 | 66.9 |
| TSIR (%) | 39.6 | 40.4 | 38.3 | 36.2 | 32.4 | 29.0 | 39.5 | 39.5 | 39.5 | 40.4 | 40.4 | 40.4 | 39.8 | 38.8 | 38.6 | 38.8 | 38.9 |
| TSET (%) | 58.7 | 59.1 | 57.1 | 55.7 | 53.0 | 50.5 | 58.6 | 58.4 | 58.2 | 58.9 | 58.8 | 58.6 | 58.5 | 57.9 | 57.8 | 57.9 | 58.0 |
| DW (nm) | 487.0 | 487.8 | 489.9 | 490.3 | 490.2 | 490.1 | 487.4 | 487.9 | 488.4 | 488.2 | 488.8 | 489.4 | 488.2 | 488.1 | 488.1 | 488.0 | 488.0 |
| Pe (%) | 5.02 | 4.59 | 4.14 | 4.25 | 4.78 | 5.31 | 4.96 | 4.88 | 4.80 | 4.53 | 4.45 | 4.38 | 4.63 | 4.68 | 4.70 | 4.75 | 4.77 |
| SC | 0.78 | 0.78 | 0.77 | 0.76 | 0.74 | 0.71 | 0.78 | 0.78 | 0.78 | 0.78 | 0.78 | 0.78 | 0.78 | 0.77 | 0.77 | 0.77 | 0.78 |

TABLE 5

Spectral Properties at 0.154 inches (3.9 mm)

| | Ex. 1 | Ex. 2 | Ex. 3 | Ex. 4 | Ex. 5 | Ex. 6 | Ex. 7 | Ex. 8 | Ex. 9 | Ex. 10 | Ex. 11 | Ex. 12 | Ex. 13 | Ex. 14 | Ex. 15 | Ex. 16 | Ex. 17 |
|---|---|---|---|---|---|---|---|---|---|---|---|---|---|---|---|---|---|
| LTA (%) | 68.3 | 69.0 | 69.7 | 70.7 | 72.3 | 66.2 | 71.3 | 69.1 | 68.2 | 67.9 | 66.8 | 69.1 | 68.7 | 69.7 | 69.2 | 65.5 | 72.4 |
| LTS (%) | 70.7 | 71.3 | 72.1 | 72.8 | 74.3 | 68.8 | 73.4 | 71.3 | 70.7 | 70.4 | 69.3 | 71.3 | 71.0 | 71.8 | 71.4 | 68.1 | 74.5 |
| TSUV (%) | 59.2 | 58.3 | 58.4 | 55.9 | 54.6 | 58.0 | 55.3 | 55.9 | 56.9 | 56.7 | 56.4 | 53.9 | 55.2 | 53.1 | 52.0 | 54.2 | 67.6 |
| TSIR (%) | 14.9 | 16.2 | 15.1 | 20.3 | 21.8 | 12.1 | 19.1 | 17.0 | 13.0 | 12.6 | 12.8 | 17.3 | 14.0 | 16.7 | 16.0 | 10.7 | 20.3 |
| TSET (%) | 40.0 | 40.9 | 40.5 | 43.8 | 45.0 | 37.4 | 43.1 | 41.2 | 38.6 | 38.2 | 38.1 | 41.4 | 39.3 | 41.0 | 40.4 | 36.1 | 44.9 |
| DW (nm) | 486.8 | 486.9 | 487.5 | 487.6 | 488.6 | 487.0 | 488.2 | 487.3 | 487.6 | 487.5 | 486.9 | 487.7 | 487.8 | 488.4 | 488.6 | 487.6 | 486.1 |
| Pe (%) | 11.22 | 10.69 | 10.44 | 8.96 | 7.79 | 12.04 | 8.71 | 10.09 | 10.98 | 11.20 | 11.58 | 9.48 | 10.42 | 9.21 | 9.17 | 11.81 | 9.49 |
| SC | 0.62 | 0.63 | 0.63 | 0.66 | 0.67 | 0.60 | 0.65 | 0.63 | 0.61 | 0.61 | 0.61 | 0.64 | 0.62 | 0.63 | 0.63 | 0.59 | 0.66 |

TABLE 5-continued

Spectral Properties at 0.154 inches (3.9 mm)

| | Ex. 18 | Ex. 19 | Ex. 20 | Ex. 21 | Ex. 22 | Ex. 23 | Ex. 24 | Ex. 25 | Ex. 26 | Ex. 27 | Ex. 28 | Ex. 29 | Ex. 30 | Ex. 31 | Ex. 32 | Ex. 33 | Ex. 34 |
|---|---|---|---|---|---|---|---|---|---|---|---|---|---|---|---|---|---|
| LTA (%) | 72.2 | 72.4 | 70.6 | 70.0 | 67.9 | 65.8 | 71.9 | 71.5 | 71.1 | 72.1 | 71.6 | 71.2 | 71.5 | 71.2 | 71.3 | 71.4 | 71.5 |
| LTS (%) | 74.3 | 74.3 | 72.5 | 72.0 | 70.0 | 68.1 | 74.0 | 73.6 | 73.1 | 74.0 | 73.6 | 73.2 | 73.4 | 73.2 | 73.3 | 73.4 | 73.5 |
| TSUV (%) | 63.7 | 59.8 | 50.1 | 48.7 | 46.2 | 43.8 | 63.6 | 63.6 | 63.5 | 59.8 | 59.7 | 59.6 | 55.8 | 55.7 | 56.0 | 56.2 | 56.8 |
| TSIR (%) | 20.4 | 21.2 | 19.3 | 17.5 | 14.4 | 11.9 | 20.4 | 20.4 | 20.3 | 21.2 | 21.2 | 21.1 | 20.7 | 19.8 | 19.6 | 19.7 | 19.8 |
| TSET (%) | 44.7 | 44.9 | 42.6 | 41.2 | 38.5 | 36.2 | 44.5 | 44.2 | 43.9 | 44.7 | 44.5 | 44.2 | 44.3 | 43.7 | 43.6 | 43.7 | 43.8 |
| DW (nm) | 486.8 | 487.6 | 489.8 | 490.1 | 490.1 | 490.0 | 487.1 | 487.7 | 488.3 | 488.0 | 488.6 | 489.2 | 488.0 | 487.9 | 487.9 | 487.8 | 487.8 |
| Pe (%) | 9.02 | 8.25 | 7.43 | 7.63 | 8.54 | 9.43 | 8.90 | 8.75 | 8.59 | 8.15 | 7.99 | 7.85 | 8.14 | 8.41 | 8.45 | 8.53 | 8.55 |
| SC | 0.66 | 0.66 | 0.64 | 0.63 | 0.61 | 0.59 | 0.66 | 0.66 | 0.66 | 0.66 | 0.66 | 0.66 | 0.66 | 0.65 | 0.65 | 0.65 | 0.65 |

TABLE 6

Spectral Properties at 0.223 inches (5.5 mm)

| | Ex. 1 | Ex. 2 | Ex. 3 | Ex. 4 | Ex. 5 | Ex. 6 | Ex. 7 | Ex. 8 | Ex. 9 | Ex. 10 | Ex. 11 | Ex. 12 | Ex. 13 | Ex. 14 | Ex. 15 | Ex. 16 | Ex. 17 |
|---|---|---|---|---|---|---|---|---|---|---|---|---|---|---|---|---|---|
| LTA (%) | 60.1 | 61.0 | 61.9 | 63.2 | 65.2 | 57.6 | 63.9 | 61.1 | 60.1 | 59.7 | 58.3 | 61.2 | 60.6 | 61.9 | 61.3 | 56.7 | 65.4 |
| LTS (%) | 63.2 | 63.9 | 65.0 | 65.8 | 67.7 | 60.8 | 66.6 | 64.0 | 63.2 | 62.8 | 61.4 | 63.9 | 63.6 | 64.6 | 64.1 | 59.9 | 68.1 |
| TSUV (%) | 51.8 | 50.9 | 50.9 | 48.1 | 46.6 | 50.3 | 47.4 | 48.1 | 49.2 | 49.0 | 48.5 | 45.7 | 47.3 | 44.9 | 43.6 | 46.0 | 61.6 |
| TSIR (%) | 7.12 | 7.93 | 7.21 | 10.9 | 11.9 | 5.4 | 9.9 | 8.5 | 5.9 | 5.6 | 5.9 | 8.8 | 6.5 | 8.3 | 7.8 | 4.5 | 10.8 |
| TSET (%) | 32.0 | 32.8 | 32.6 | 35.1 | 36.3 | 29.9 | 34.7 | 33.0 | 31.0 | 30.7 | 30.4 | 33.0 | 31.5 | 32.8 | 32.2 | 28.7 | 36.6 |
| DW (nm) | 486.6 | 486.7 | 487.3 | 487.3 | 488.5 | 486.8 | 488.1 | 487.1 | 487.4 | 487.3 | 486.7 | 487.5 | 487.6 | 488.2 | 488.4 | 487.4 | 485.9 |
| Pe (%) | 15.82 | 15.09 | 14.72 | 12.72 | 11.07 | 16.90 | 12.34 | 14.26 | 15.45 | 15.75 | 16.29 | 13.42 | 14.68 | 13.02 | 12.96 | 16.55 | 13.48 |
| SC | 0.55 | 0.56 | 0.56 | 0.58 | 0.59 | 0.54 | 0.58 | 0.56 | 0.54 | 0.54 | 0.54 | 0.56 | 0.55 | 0.56 | 0.56 | 0.53 | 0.59 |

| | Ex. 18 | Ex. 19 | Ex. 20 | Ex. 21 | Ex. 22 | Ex. 23 | Ex. 24 | Ex. 25 | Ex. 26 | Ex. 27 | Ex. 28 | Ex. 29 | Ex. 30 | Ex. 31 | Ex. 32 | Ex. 33 | Ex. 34 |
|---|---|---|---|---|---|---|---|---|---|---|---|---|---|---|---|---|---|
| LTA (%) | 65.1 | 65.3 | 63.0 | 62.3 | 59.6 | 57.1 | 64.8 | 64.2 | 63.7 | 64.9 | 64.3 | 63.8 | 64.1 | 63.8 | 63.9 | 64.0 | 64.2 |
| LTS (%) | 67.8 | 67.8 | 65.5 | 64.8 | 62.3 | 59.9 | 67.4 | 66.8 | 66.3 | 67.6 | 66.9 | 66.3 | 66.6 | 66.3 | 66.4 | 66.6 | 66.8 |
| TSUV (%) | 57.0 | 52.5 | 41.5 | 40.0 | 37.2 | 34.7 | 56.9 | 56.8 | 56.7 | 52.4 | 52.3 | 52.2 | 48.2 | 48.0 | 48.4 | 48.6 | 49.3 |
| TSIR (%) | 10.8 | 1.4 | 10.0 | 8.8 | 6.7 | 5.2 | 10.8 | 10.8 | 10.8 | 11.4 | 11.4 | 11.4 | 11.1 | 10.4 | 10.3 | 10.4 | 10.4 |
| TSET (%) | 36.3 | 36.4 | 33.9 | 32.7 | 30.4 | 28.3 | 36.0 | 35.6 | 35.3 | 36.1 | 35.7 | 35.4 | 35.6 | 35.1 | 35.1 | 35.2 | 35.3 |
| DW (nm) | 486.5 | 487.4 | 489.7 | 490.1 | 490.0 | 489.9 | 486.9 | 487.5 | 488.1 | 487.8 | 488.5 | 489.1 | 487.9 | 487.7 | 487.7 | 487.7 | 487.6 |
| Pe (%) | 12.80 | 11.73 | 10.53 | 10.80 | 12.04 | 13.24 | 12.64 | 12.39 | 12.16 | 11.56 | 11.33 | 11.11 | 11.57 | 11.93 | 12.0 | 12.11 | 12.14 |
| SC | 0.59 | 0.59 | 0.57 | 0.56 | 0.54 | 0.52 | 0.59 | 0.58 | 0.58 | 0.59 | 0.59 | 0.58 | 0.58 | 0.58 | 0.58 | 0.58 | 0.58 |

Referring to Tables 1–5, the present invention provides a blue colored glass using a standard soda-lime-silica glass base composition and additionally iron and cobalt, and optionally chromium, as infrared and ultraviolet radiation absorbing materials and colorants. In particular, the infrared and ultraviolet radiation absorbing and colorant portion of the glass includes about 0.40 to 1.0 wt. % total iron, preferably about 0.50 to 0.75 wt. % total iron, and about 4 to 40 PPM CoO, preferably about 4 to 20 PPM CoO. In addition, the composition may include up to 100 PPM $Cr_2O_3$, preferably 25 to 50 PPM. The glass has a redox of greater than 0.35 up to 0.60, preferably from about 0.36 to 0.50. In one embodiment of the invention, the glass has a luminous transmittance (LTA) of at least 55%, a dominant wavelength of between about 485 to 489 nm, preferably 487 to 489 nm. In another embodiment of the invention, glass has a luminous transmittance of at least 65% at a thickness of 0.154 inches and a dominant wavelength of about 485 to 492 nm, preferably about 487 to 489 nm. The glass has an excitation purity of about 3 to 18%. However, it should be appreciated that excitation purity depends on the glass thickness. As a result, it is preferred that glass of the present invention having a thickness of about 0.071 to 0.126 inches (1.8 to 3.2 mm) have a Pe of about 3 to 8%; a thickness of about 0.126 to 0.189 inches (3.2 to 4.9 mm) have a Pe of about 5 to 12%; and a thickness of about 0.189 to 0.315 inches (4.9 to 8 mm) have a Pe of about 10 to 18%.

In another embodiment of the instant, the infrared and ultraviolet radiation absorbing materials and colorants of the glass include about 0.50 to 0.60 wt. % total, about 4 to 12 PPM CoO, 0 to about 100 PPM $Cr_2O_3$, and 0 to about 0.50 wt. % $TiO_2$, and a redox of about 0.45 to 0.50. In one particular embodiment, the glass includes only trace amounts of $Cr_2O_3$ and up to about 0.021 wt. % $TiO_2$. In addition, the glass has a luminous transmittance (LTA) of at least 70%, a TSUV of no greater than 60%, a TSIR of no greater than about 30%, and/or a TSET of no greater than 50% at a thickness of about 0.154 inches. The color of the glass is characterized by a dominant wavelength of between about 487 to 489 nm and an excitation purity of about 7–10%.

Glass compositions as disclosed herein and made by the float process typically range from a sheet thickness of about 1 millimeter to 10 millimeters.

For the vehicle glazing applications, it is preferred that the glass sheets having a composition as disclosed herein have a thickness within the range of 0.071 to 0.197 inches (1.8 to 5 mm). It is anticipated that when using a single glass ply, the glass will be tempered, e.g. for an automotive side or rear window, and when multiple plies are used, the glass will be annealed and laminated together using a thermoplastic adhesive, e.g. an automobile windshield which laminates two annealed glass plies together using a polyvinyl butyral interlayer, wherein at least one of the glass plies is a glass sheet having a composition as disclosed herein. In addition, when the glass is used in selected areas of a motor vehicle, e.g. the windshield and front door windows and in some instances the rear window, it is required that the glass have an LTA of at least 70%. In addition, the glass compositions disclosed in the present invention should have a TSUV of no greater than 60%, preferably no greater than 57%, a TSIR of no greater than about 35%, preferably no greater than about 30%, and/or a TSET of no greater than about 55%, preferably, no greater than about 50% at a thickness of about 0.154 inches.

In architectural glazing applications, there is generally no legal requirement with respect to solar transmittance (LTS) of the glass; however, in the present invention, it is preferred that the glass have an LTS of about 60 to 70%, preferably about 63 to 67% and a shading coefficient of no greater than about 0.70, and preferably no greater than about 0.65 at a thickness of about 0.223 inches.

It is expected that the spectral properties of the glass will change after tempering the glass and further upon prolonged exposure to ultraviolet radiation, commonly referred to as solarization. In particular, it is estimated that tempering and solarization of the glass compositions disclosed herein will reduce LTA, LTS and TSIR by about 0.5 to 1%, reduce the TSUV by about 1 to 2%, and TSET by about 1 to 1.5%. As a result, in one embodiment of the invention, the glass composition has selected spectral properties that initially fall outside the desired ranges previously discussed but fall within the desired ranges after tempering and/or solarization.

It should also be appreciated that since the luminous and solar transmittance (LTA and LTS) is reduced by these conditions, in order to maintain the transmittance above a desired minimum level, the initial LTA or LTS of the glass after production should be sufficiently high so that any losses attributable to tempering and solarization will not reduce the transmittance to an unacceptable level.

Vanadium may be used as a partial or complete replacement for the chromium in the glass compositions of the present invention. More specifically, vanadium, which is expressed herein in terms of $V_2O_5$, imparts a yellow-green color to the glass and absorbs both ultraviolet and infrared radiation at different valence states. It is believed that the 100 PPM $Cr_2O_3$ as discussed above may be completely replaced by about 400 PPM $V_2O_5$.

As discussed earlier, other materials may also be added to the glass compositions disclosed herein to further reduce infrared and ultraviolet radiation transmission and/or control glass color. Inclusion of chromium and manganese has been discussed earlier. It is contemplated that the following materials may also be added to the iron and cobalt containing soda-lime-silica disclosed herein:

| | |
|---|---|
| $SnO_2$ | 0 to about 2.0 wt. % |
| $CeO_2$ | 0 to about 1.0 wt. % |
| $TiO_2$ | 0 to about 0.5 wt. % |
| ZnO | 0 to about 0.5 wt. % |
| $Nd_2O_3$ | 0 to about 0.5 wt. % |
| $MoO_3$ | 0 to about 100 PPM |
| NiO | 0 to about 10 PPM |
| Se | 0 to about 3 PPM |

As should be appreciated, adjustment may have to be made to the basic constituents of the glass to account for any coloring and/or redox affecting power of these additional materials.

Other variations as are known to those of skill in the art may be resorted to without departing from the scope of the invention as defined by the claims that follow.

What is claimed is:

1. A blue colored, infrared and ultraviolet radiation absorbing glass composition having a base glass portion comprising:

$SiO_2$ about 66 to 75 percent by weight $Na_2O$ about 10 to 20 percent by weight CaO about 5 to 15 percent by weight MgO 0 to about 5 percent by weight $Al_2O_3$ 0 to about 5 percent by weight $K_2O$ 0 to about 5 percent by weight and a solar radiation absorbing and colorant portion consisting essentially of:

total iron about 0.40 to 1.0 percent by weight

CoO about 4 to 40 PPM $Cr_2O_3$ 0 to about 100 PPM, the glass having a redox of greater than 0.35 up to about 0.60, a luminous transmittance of at least 55 percent, and a color characterized by a dominant wavelength of 485 to 489 nanometers and an excitation purity of about 3 to 18 percent, and wherein the glass has a total solar ultraviolet transmittance of about 60 percent or less, a total solar infrared transmittance of about 35 percent or less and a total solar energy transmittance of about 55 percent or less at a thickness of about 0.154 inches.

2. The composition as in claim 1 wherein the total iron concentration is from about 0.50 to 0.75 weight percent and the redox is from about 0.36 to 0.50.

3. The composition as in claim 2 wherein the CoO concentration is from about 4 to 20 PPM.

4. The composition as in claim 3 wherein the color of the glass is characterized by a dominant wavelength in the range of about 487 to 489 nanometers and an excitation purity of about 3 to 8 percent at one or more thicknesses within the range of from about 0.071 to 0.126 inches, an excitation purity of about 5 to 12 percent at one or more thicknesses within the range of from about 0.126 to 0.189 inches, and an excitation purity of about 10 to 18 percent at one or more thicknesses within the range of from about 0.189 to 0.315 inches.

5. The composition as in claim 4 wherein the glass has a luminous transmittance of about 70 percent or greater.

6. The composition as in claim 4 wherein the glass with a thickness of about 0.023 inches has a solar transmittance of about 55 to 70 percent and a shading coefficient of about 0.70 or less.

7. The composition as in claim 1 wherein the CoO concentration is from about 4 to 20 PPM.

8. A blue colored, infrared and, ultraviolet radiation absorbing glass composition having, a base glass portion comprising:

$SiO_2$ about 66 to 75 percent by weight $Na_2O$ about 10 to 20 percent by weight CaO 0 about 5 to 15 percent by weight MgO 0 to about 5 percent by weight $Al_2O_3$ 0 to about 5 percent by weight $K_2O_3$ 0 to about 5 percent by weight and a solar radiation absorbing and colorant portion consisting essentially of:

total iron about 0.40 to 1.0 percent by weight

CoO about 4 to 40 PPM $Cr_2O_3$ concentration is from about 25 to about 100 PPM, the glass having a redox of greater than 0.35 up to about 0.60, a luminous transmittance of at least 55 percent, and a color characterized by a dominant wavelength of 485 to 489 nanometers and an excitation purity of about 3 to 18 percent, and wherein the glass has a total solar ultraviolet transmittance of about 60 percent or less, a total solar infrared transmittance of about 35 percent or less and a total solar energy transmittance of about 55 percent or less at a thickness of about 0.154 inches.

9. The composition as in claim 1 wherein the glass has a luminous transmittance of about 70 percent or greater.

10. The composition as in claim 9 wherein the glass with a thickness of about 0.154 inches has a total solar ultraviolet transmittance of about 57 percent or less, a total solar infrared transmittance of about 30 percent or less and a total solar energy transmittance of about 50 percent or less.

11. The composition as in claim 1 wherein the glass with a thickness of about 0.223 inches has a solar transmittance of about 55 to 70 percent and a shading coefficient of about 0.70 or less.

12. The composition as in claim 11 wherein the glass with a thickness of about 0.223 inches has a solar transmittance of about 63 to 67 percent and a shading coefficient of about 0.65 or less.

13. The composition as in claim 1 wherein the color of the glass is characterized by a dominant wavelength in the range of about 487 to 489 nanometers.

14. The composition as in claim 1 wherein the color of the glass is characterized by an excitation purity of about 3 to 8 percent at one or more thicknesses within the range of from about 0.071 to 0.126 inches, an excitation purity of about 5 to 12 percent at one or more thicknesses within the range of from about 0.126 to 0.189 inches, and an excitation purity of about 10 to 18 percent at one or more thicknesses within the range of from about 0.189 to 0.315 inches.

15. A glass sheet made by a float process from the glass composition as recited in claim 1.

16. An automobile windshield made from at least one glass sheet of claim 15.

17. The glass sheet as in claim 15 wherein the sheet has a thickness between 1.8 to 10 mm.

18. A blue colored, infrared and ultraviolet radiation absorbing glass composition having a base glass portion comprising:

$SiO_2$ about 66 to 75 percent by weight
$Na_2O$ about 10 to 20 percent by weight
CaO about 5 to 15 percent by weight
MgO 0 to about 5 percent by weight
$Al_2O_3$ 0 to about 5 percent by weight
$K_2O$ 0 to about 5 percent by weight and a solar radiation absorbing and colorant portion consisting essentially of:

total iron about 0.40 to 1.0 percent by weight
CoO about 4 to 40 PPM
$SnO_2$ 0 to about 2.0 percent by weight
$CeO_2$ 0 to about 1.0 percent by weight
$TiO_2$ 0 to about 0.5 percent by weight
ZnO 0 to about 0.5 percent by weight
$Nd_2O_3$ 0 to about 0.5 percent by weight
$MnO_2$ 0 to about 0.1 percent by weight
$MoO_3$ 0 to about 100 PPM
$Cr_2O_3$ 0 to about 100 PPM,
$V_2O_5$ 0 to about 400 PPM NiO 0 to about 10 PPM
Se 0 to about 3 PPM the glass having a redox greater than 0.35 up to about 0.60, a luminous transmittance of at least 55 percent, and a color characterized by a dominant wavelength of 485 to 489 nanometers and an excitation purity of about 3 to 18 percent, and wherein the glass has a total solar ultraviolet transmittance of about 60 percent or less, a total solar infrared transmittance of about 35 percent or less and a total solar energy transmittance of about 55 percent or less for a thickness of about 0.154 inches.

19. The composition as in claim 18 wherein the color of the glass is characterized by a dominant wavelength in the range of about 487 to 489 nanometers and an excitation purity of about 3 to 8 percent at one or more thicknesses within the range of from about 0.071 to 0.126 inches, an excitation purity of about 5 to 12 percent at one or more thicknesses within the range of from about 0.126 to 0.189 inches, and an excitation purity of about 10 to 18 percent at one or more thicknesses within the range of from about 0.189 to 0.315 inches.

20. A blue colored, infrared and ultraviolet radiation absorbing glass composition having a base glass portion comprising:

$SiO_2$ about 66 to 75 percent by weight
$Na_2O$ about 10 to 20 percent by weight
CaO about 5 to 15 percent by weight
MgO 0 to about 5 percent by weight
$Al_2O_3$ 0 to about 5 percent by weight
$K_2O$ 0 to about 5 percent by weight and a solar radiation absorbing and colorant portion consisting essentially of:

total iron about 0.40 to 1.0 percent by weight
CoO about 4 to 40 PPM
$Cr_2O_3$ 0 to about 100 PPM, the glass having a redox of greater than 0.35 up to about 0.60, a luminous transmittance of at least 65% at a thickness of about 0.154 inches, and a color characterized by a dominant wavelength of about 485 to 492 nanometers and an excitation purity of about 3 to 18 percent, wherein the glass has a total solar ultraviolet transmittance of about 60 percent or less, a total solar infrared transmittance of about 35 percent or less and a total solar energy transmittance of about 55 percent or less at a thickness of about 0.154 inches.

21. The composition as in claim 20 wherein the total iron concentration is from about 0.50 to 0.75 weight percent, the CoO concentration is from about 4 to 20 PPM, and the redox is from about 0.36 to 0.50, and the color of the glass is characterized by a dominant wavelength in the range of about 487 to 489 nanometers and an excitation purity of about 3 to 8 percent at one or more thicknesses in the range of from about 0.071 to 0.126 inches, an excitation purity of about 5 to 12 percent at one or more thicknesses in the range of from about 0.126 to 0.189 inches, and an excitation purity of about 10 to 18 percent at one or more thicknesses in the range of from about 0.189 to 0.315 inches.

22. A blue colored, infrared and ultraviolet radiation absorbing glass composition having a base glass portion comprising:

$SiO_2$ about 66 to 75 percent by weight
$Na_2O$ about 10 to 20 percent by weight
CaO about 5 to 15 percent by weight
MgO 0 to about 5 percent by weight
$Al_2O_3$ 0 to about 5 percent by weight $K_2O$ 0 to about 5 percent by weight and a solar radiation absorbing and colorant portion consisting essentially of:

total iron about 0.40 to 1.0 percent by weight

CoO about 4 to 40 PPM $SnO_2$ 0 to about 2.0 percent by weight $CeO_2$ 0 to about 1.0 percent by weight $TiO_2$ 0 to about 0.5 percent by weight ZnO 0 to about 0.5 percent by weight $Nd_2O_3$ 0 to about 0.5 percent by weight $MnO_2$ 0 to about 0.1 percent by weight $MoO_3$ 0 to about 100 PPM $Cr_2O_3$ 0 to about 100 PPM, $V_2O_5$ 0 to about 400 PPM NiO 0 to about 10 PPM Se 0 to about 3 PPM the glass having a redox of greater than 0.35 up to about 0.60, a luminous transmittance of at least 65% at a thickness of about 0.154 inches, and a color characterized by a dominant wavelength of 485 to 492 nanometers and an excitation purity of about 3 to 18 percent, wherein the glass has a total solar ultraviolet transmittance of about 60 percent or less, a total solar infrared transmittance of about 35 percent or less and a total solar energy transmittance of about 55 percent or less at a thickness of about 0.154 inches.

23. The composition as in claim 22 wherein the color of the glass is characterized by a dominant wavelength in the range of about 487 to 489 nanometers and an excitation purity of about 3 to 8 percent at one or more thicknesses in the range of from about 0.071 to 0.126 inches, an excitation purity of about 5 to 12 percent at one or more thicknesses in the range of from about 0.126 to 0.189 inches, and an excitation purity of about 10 to 18 percent at one or more thicknesses in the range of from about 0.189 to 0.315 inches.

24. A blue colored, infrared and ultraviolet radiation absorbing glass composition having a base glass portion comprising:

$SiO_2$ about 66 to 75 percent by weight $Na_2O$ about 10 to 20 percent by weight CaO about 5 to 15 percent by weight MgO 0 to about 5 percent by weight $Al_2O_3$ 0 to about 5 percent by weight $K_2O$ 0 to about 5 percent by weight and a solar radiation absorbing and colorant portion consisting essentially of:

total iron about 0.50 to 0.60 percent by weight

CoO about 4 to 12 PPM $Cr_2O_3$ 0 to about 100 PPM $TiO_2$ 0 to about 0.50 percent by weight, the glass having a redox of about 0.45 to 0.50, a luminous transmittance of at least 70% at a thickness of about 0.154 inches, and a color characterized by a dominant wavelength of 487 to 489 nanometers and an excitation purity of about 7 to 10 percent, wherein the glass has a total solar ultraviolet transmittance of about 60 percent or less, a total solar infrared transmittance of about 35 percent or less and a total solar energy transmittance of about 55 percent or less at a thickness of about 0.154 inches.

25. The composition as in claim 24 wherein the glass with a thickness of about 0.154 inches has a total solar ultraviolet transmittance of about 60 percent or less, a total solar infrared transmittance of about 30 percent or less and a total solar energy transmittance of about 50 percent or less.

26. The composition of claim 1 which includes up to about 0.3 wt % $SO_3$.

27. The composition of claim 1 wherein the glass composition has amber coloration formed under reducing conditions from iron and sulfur in the batch materials as a melting and refining aid for a soda-lime-silica glass resulting in a lower luminous transmittance within the range of at least 55 percent than when the amber coloration is absent.

28. The composition of claim 22 which includes up to about 0.3 wt % $SO_3$.

29. The composition of claim 22 wherein the glass composition has amber coloration formed under reducing conditions from iron and sulfur in the batch materials as a melting and refining aid for a soda-lime-silica glass resulting in a lower luminous transmittance within the range of at least 55 percent than when the amber coloration is absent.

* * * * *